April 19, 1932.  F. P. RUST  1,854,673
ANIMAL CHUTE FOR VEHICLES
Filed March 24, 1931  5 Sheets-Sheet 1
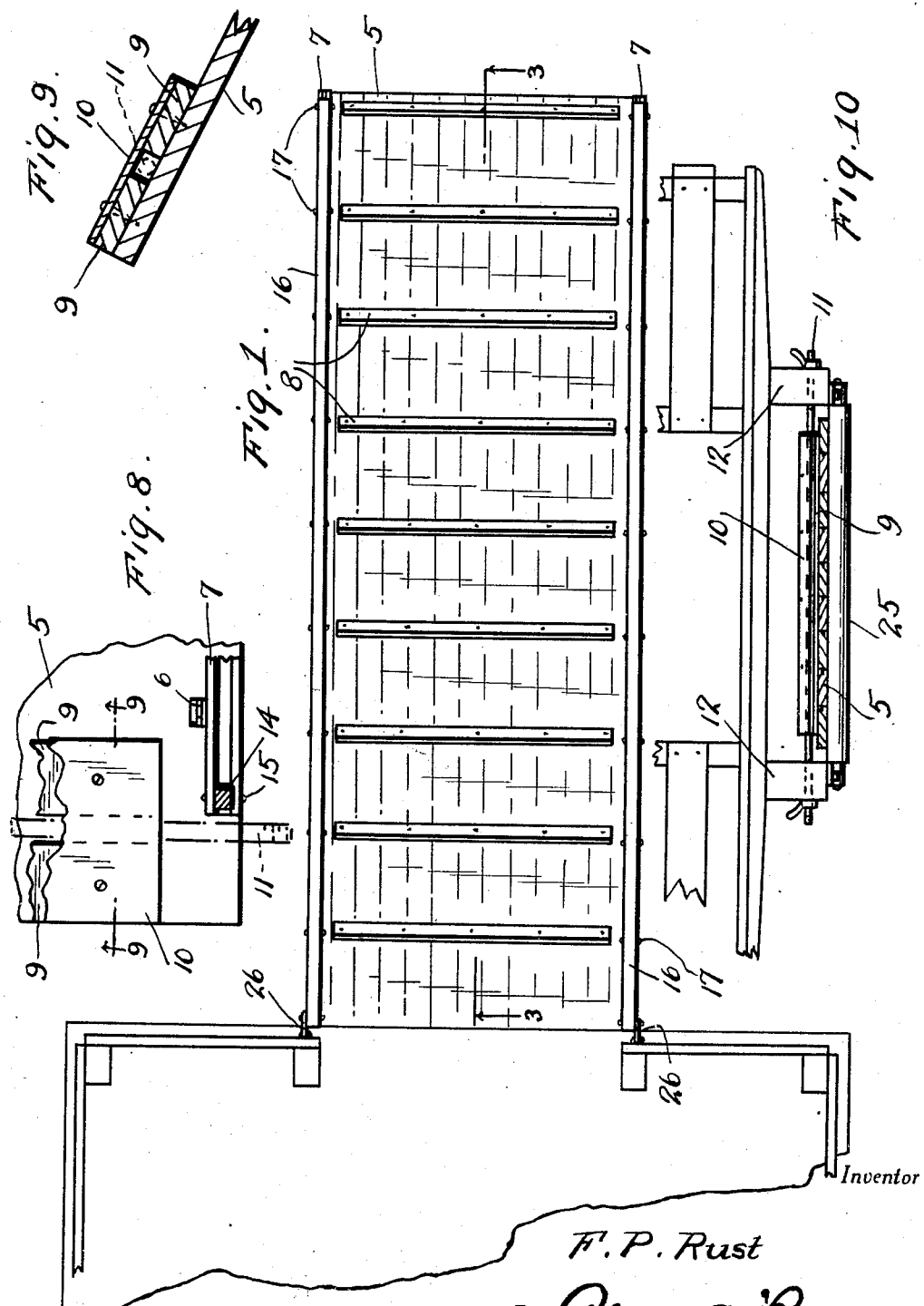
Inventor
F. P. Rust
By Clarence A. O'Brien
Attorney

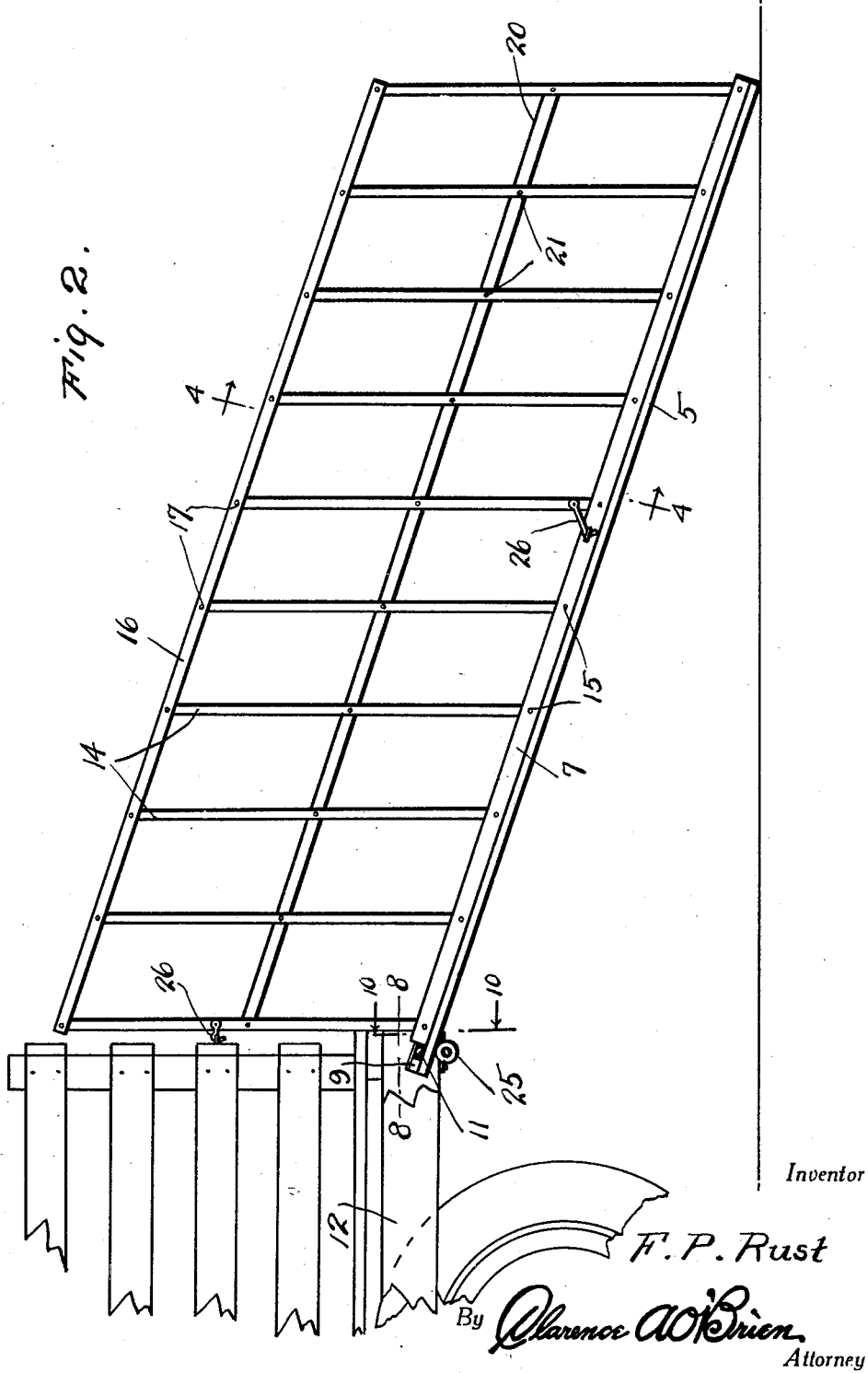

April 19, 1932.　　　F. P. RUST　　　1,854,673
ANIMAL CHUTE FOR VEHICLES
Filed March 24, 1931　　　5 Sheets-Sheet 3
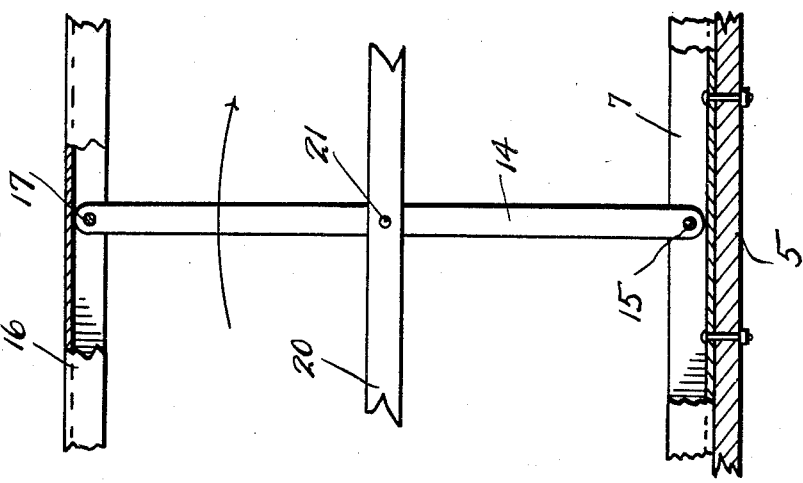
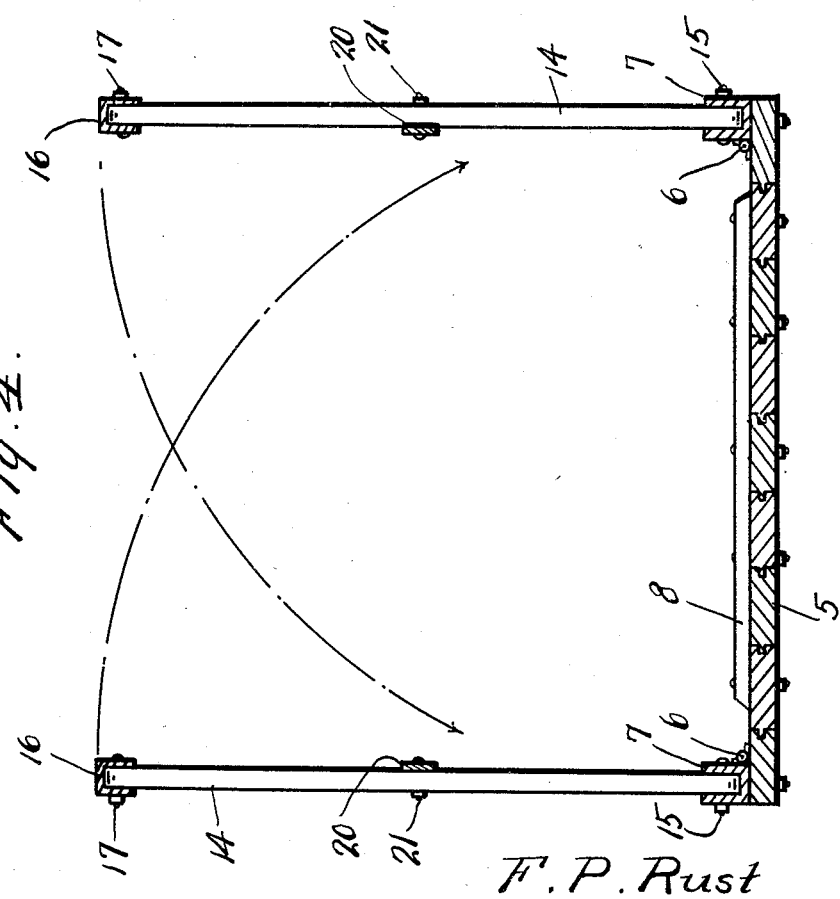
Inventor
F. P. Rust
By Clarence A. O'Brien
Attorney

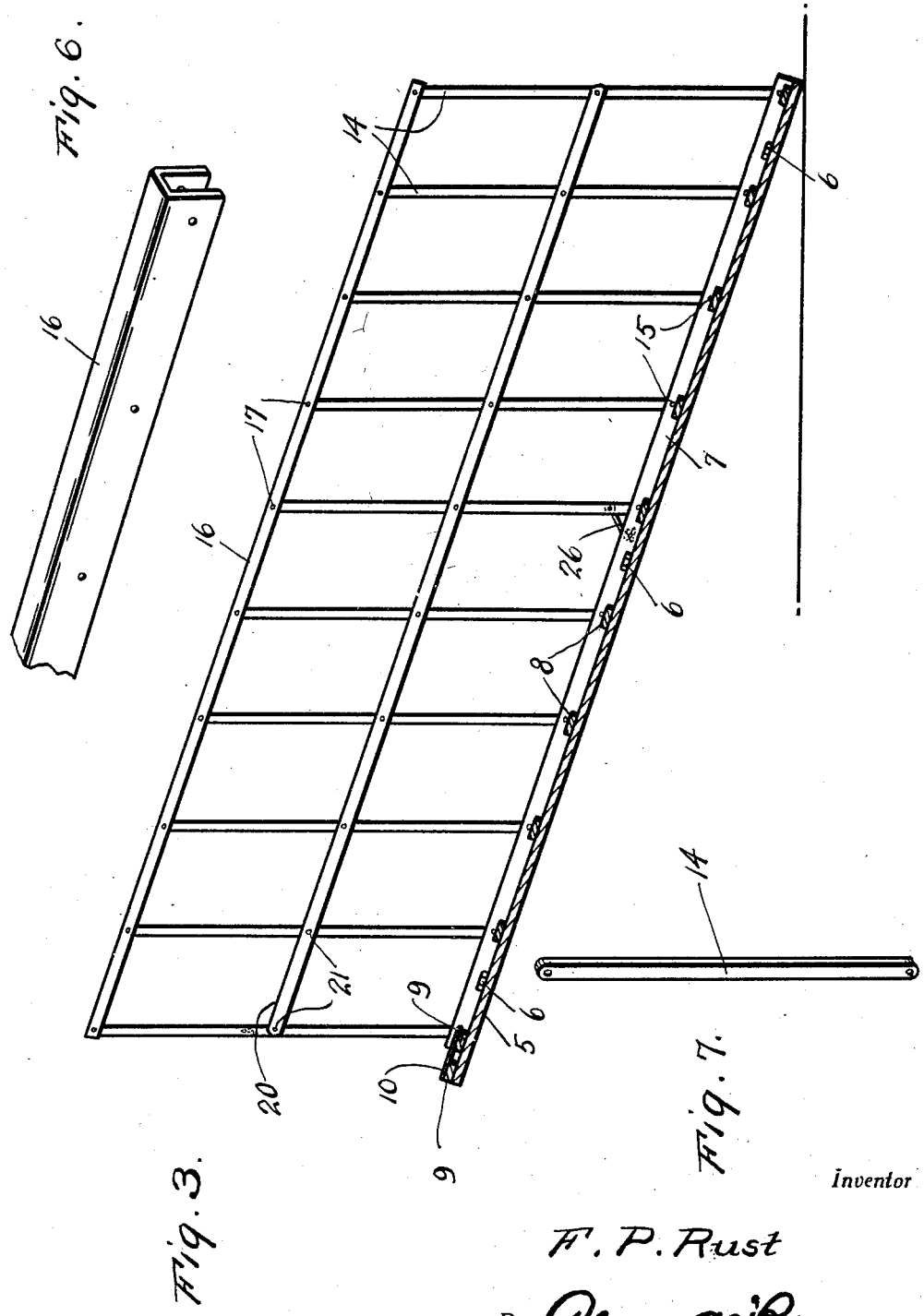

April 19, 1932.   F. P. RUST   1,854,673
ANIMAL CHUTE FOR VEHICLES
Filed March 24, 1931   5 Sheets-Sheet 5
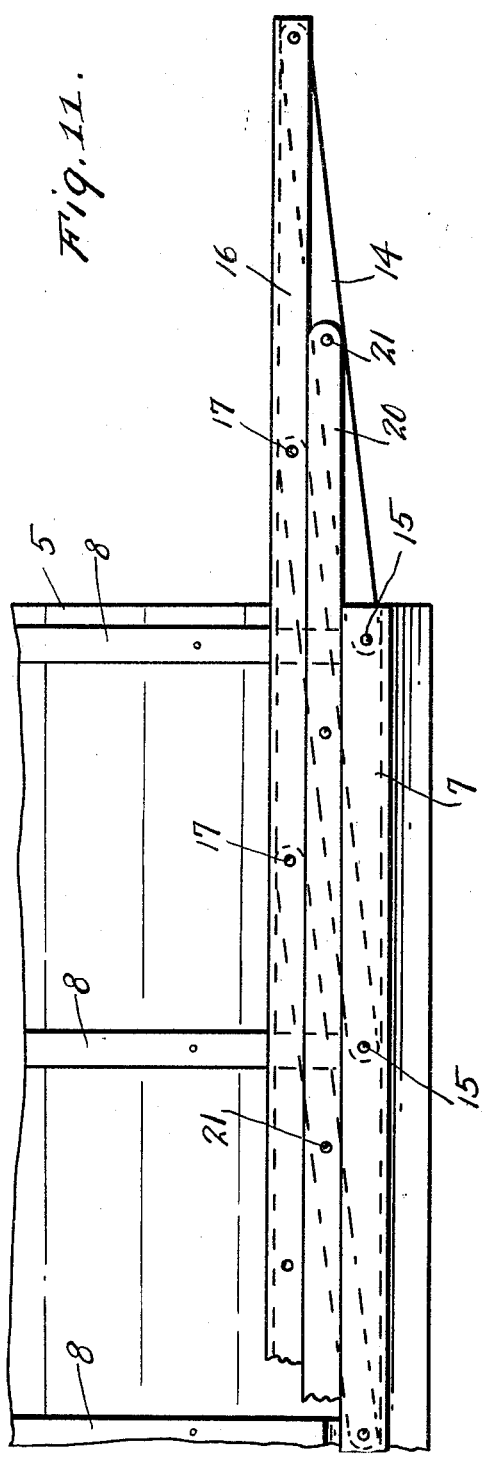
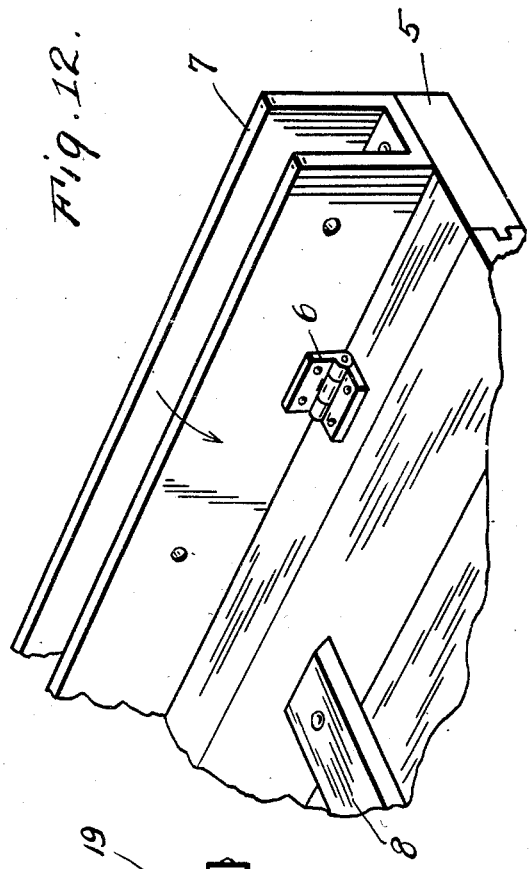
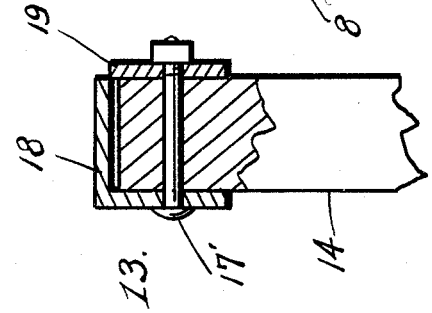
Inventor
F. P. Rust
By Clarence A. O'Brien
Attorney Patented Apr. 19, 1932

1,854,673

UNITED STATES PATENT OFFICE

FRIEDRICH P. RUST, OF ESTELLINE, SOUTH DAKOTA

ANIMAL CHUTE FOR VEHICLES

Application filed March 24, 1931. Serial No. 524,987.

The present invention relates to animal chutes and particularly to loading and unloading chutes.

The object of the invention resides in the provision of a compact and light weight chute of this nature which is exceedingly simple in construction, easy to manipulate and hold, thoroughly efficient and reliable in use, inexpensive to manufacture, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the chute embodying the features of my invention.

Figure 2 is a side elevation thereof.

Figure 3 is a vertical longitudinal section therethrough.

Figure 4 is a vertical transverse section therethrough taken substantially on the line 4—4 of Figure 2.

Figure 5 is a detail section taken vertically through the channel members,

Figure 6 is a fragmentary perspective view of the upper channeled rail.

Figure 7 is a perspective view of one of the uprights.

Figure 8 is a fragmentary perspective view taken substantially on the line 8—8 of Figure 2.

Figure 9 is an enlarged detail section taken longitudinally through the upper end of the platform.

Figure 10 is a section taken substantially on the line 10—10 of Figure 2.

Figure 11 is a fragmentary top plan view of the chute showing one side folded.

Figure 12 is a fragmentary perspective view showing one of the bottom channeled rails, and Figure 13 is a sectional view through a modified form of the upper rail.

Referring to the drawings in detail it will be seen that the numeral 5 denotes a platform on the longitudinal sides of which are hingedly mounted as at 6 channel members 7. A plurality of cleats 8 are disposed transversely of the platform 5. A pair of spaced cleats 9 are disposed across the upper end of the platform and a plate 10 is fixed across these cleats 9 so as to form an opening for receiving a rod 11 which may be disposed through sides of a truck frame or the like and held in place by suitable means so that the platform may be positioned in an inclined position from the rear of the truck or vehicle body.

A plurality of bars 14 are pivotally mounted at their lower ends as at 15 in the channeled members 7. Inverted channel rails 16 receive the upper ends of the bars 14 which are pivoted thereto as at 17. Instead of these inverted channel rails 16 there may be provided angular rails 18 as is shown in Figure 13 in combination with plates 19 and bolts 17'. Intermediate rods 20 are pivotally engaged as at 21 with the bars 14. Thus the sides formed by the rails 7, 16 and the bars 14 and rods 20 may be folded to the position shown in Figure 11 but the platform may be moved up under the truck body after the rod 11 has been removed. In order to assist the manipulation of the platform I provide a roller 25 mounted under the frame 12 as is indicated to advantage in Figures 2 and 10. As is indicated to advantage in Figures 1 and 2 I provide hooks 26 on a pair of the end bars 14 for engaging with eyes on the ends of the truck or vehicle body to hold the sides in upright position.

It is thought that the construction, utility, operation and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described including, in combination a platform, a pair of channel members hingedly mounted on the platform longitudinally thereof, a plurality of rods pivotally mounted in the channel members, and members pivotally connected to the upper ends of the rods.

2. A device of the class described including, in combination a platform, a pair of channel members hingedly mounted on the platform longitudinally thereof, a plurality of rods pivotally mounted in the channel members, members pivotally connected to the upper ends of the rods, and members pivotally mounted with intermediate portions of the rods.

3. A device of the class described including, in combination a platform, a pair of channel members hingedly mounted on the platform longitudinally thereof, a plurality of rods pivotally mounted in the channel members, members pivotally connected to the upper ends of the rods, and members pivotally mounted with intermediate portions of the rods, said second mentioned members being of inverted channel formation.

4. A device of the class described, including, in combination a platform, a pair of channel members hingedly mounted on the platform longitudinally thereof, a plurality of rods pivotally mounted in the channel members, members pivotally connected to the upper ends of the rods, cleats across the platform in spaced relation a plate attached to the cleats to form an opening, and a rod insertable in the opening to hold the upper end of the platform in place.

In testimony whereof I affix my signature.

FRIEDRICH P. RUST.